March 24, 1942.   M. E. FIENE   2,277,429
REFRIGERATING SYSTEM
Filed Sept. 17, 1941
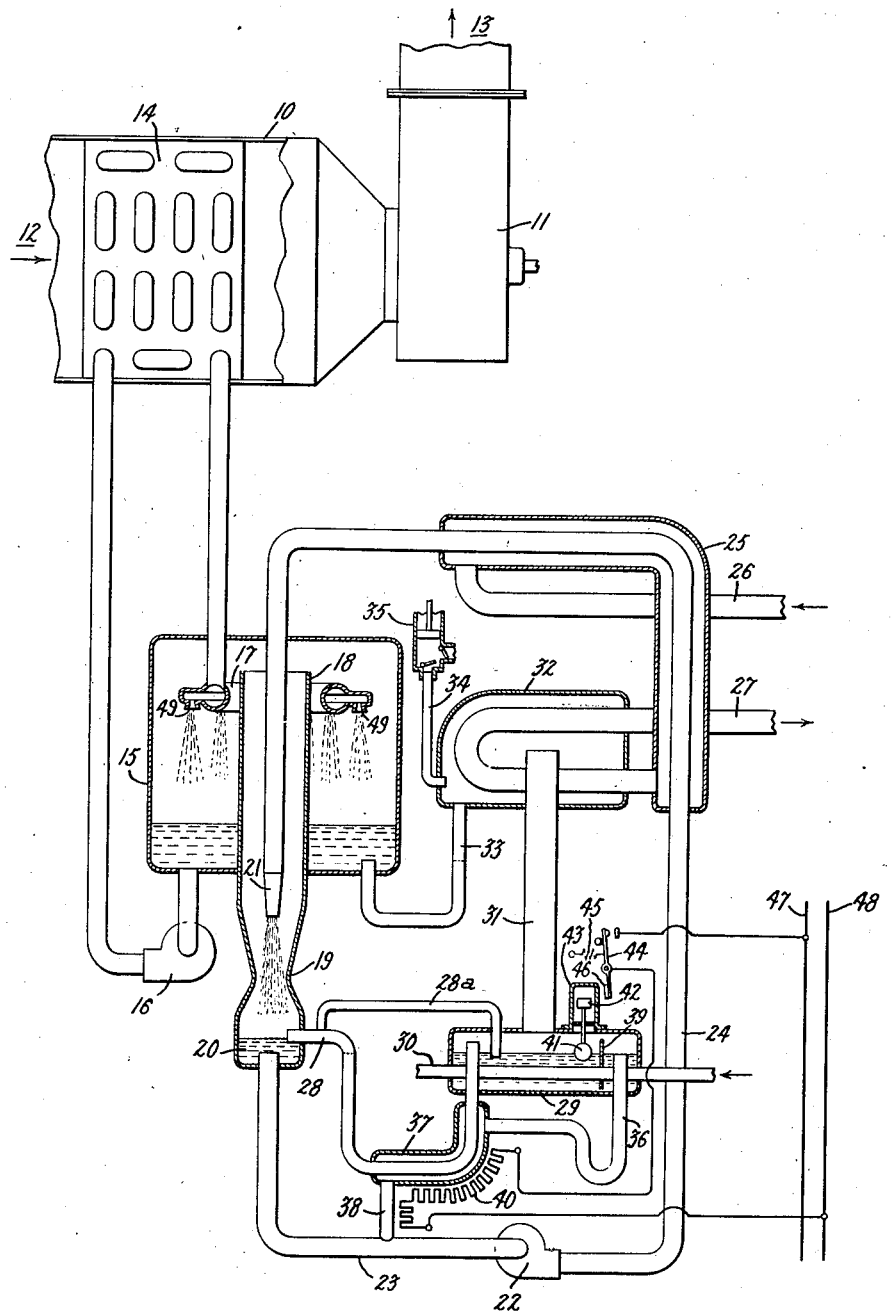
Inventor:
Marcus E. Fiene,
by Harry E. Dunham
His Attorney.

Patented Mar. 24, 1942

2,277,429

UNITED STATES PATENT OFFICE 2,277,429

REFRIGERATING SYSTEM

Marcus E. Fiene, Caldwell, N. J., assignor to General Electric Company, a corporation of New York Application September 17, 1941, Serial No. 411,101

7 Claims. (Cl. 62—5)

My invention relates to refrigerating systems of the absorption type and particularly to such systems which employ hygroscopic salt solutions and the like.

In absorption type refrigerating system such as those employing lithium chloride or sodium hydroxide certain conditions may be met during the normal operation of the system which result in an undesirable cooling of a portion of the concentrated solution which in some cases may solidify and prevent the operation of the system. It is desirable that the existence of these adverse conditions be determined as soon as possible and corrected in order to maintain the system in operation.

It is an object of my invention to provide a refrigerating system of the absorption type including an improved arrangement for preventing undesirable solidification of the concentrated solution and interruption of the operation of the system.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing, the single figure of which illustrates diagrammatically an air cooling apparatus provided with an absorption type refrigerating system embodying my invention.

Briefly, the system illustrated in the drawing comprises a refrigerating machine of the absorption type employing a suitable hygroscopic substance such as lithium chloride or sodium hydroxide and a refrigerant such as water. The refrigerant cooled by the refrigerating machine is employed to cool air circulating through the duct of an air conditioning apparatus. During the operation of the refrigerating machine the solution becomes weak and must be again concentrated, and under certain conditions the concentrated solution returning from the concentrator may become solidified. In order to prevent stopping of the system; should this occur, an arrangement has been provided for applying heat to thaw the solidified portion of the solution and maintain the machine in operation.

Referring now to the drawing, I have shown an air circulating duct 10 and a fan 11 for circulating air through the duct from an inlet 12 to an outlet 13 over the surface of a cooling coil 14. Refrigerant for the coil 14 is supplied from a closed evaporator 15 by a pump 16 and is returned from the coil to a spray head 17 arranged within the evaporator. The evaporator 15 is a portion of an absorption type refrigerating system employing any suitable refrigerant such as water and a suitable absorbent such as lithium chloride or sodium hydroxide. The evaporator 15 is provided with an upstanding cylindrical wall 18 which extends above the spray head 17 and terminates below the evaporator in a Venturi tube 19 and a sump 20. The absorbing solution is sprayed into the cylinder 18 from a nozzle 21. The action of the venturi assists in the reduction of the pressure within the evaporator 15 and assists the absorbing action of the solution, thereby increasing the evaporation of the refrigerant in the evaporator 15, which thereby cools the refrigerant before it is recirculated by the pump 16 through the cooling coil 14. The solution reaching the sump 20 is recirculated by a pump 22 which forces it through conduits 23 and 24 and back to the nozzle 21. A portion of the conduit 24 is enclosed in a jacket 25 through which cooling water is passed from an inlet 26 to an outlet 27, thereby cooling the solution before it is discharged from the nozzle 21. When the solution in circulation has been weakened sufficiently the level of the solution in the sump 20 will rise until a portion of the solution flows through a U-shaped conduit 28 which terminates within a concentrating chamber 29. The solution within the chamber 29 is heated by a steam pipe 30 passing through the concentrator 29, and a portion of the water or other refrigerant is thereby vaporized and flows upwardly through a connection 31 to a condenser 32. The condenser 32 is cooled by a turn of the water cooling outlet conduit 27. The refrigerant condensed in the condenser 32 is returned to the evaporator 15 through a connection 33. Any non-condensable gas which collects in the condenser 32 may be removed therefrom through a connection 34 by operation of a suitable pump 35. Concentrated solution flows from the concentrator 29 to the conduit 23 through a connection 36, a heat exchange jacket 37 and a connection 38. The heat exchange jacket 37 surrounds a portion of the U-shaped conduit 28 so that the relatively cool weak solution is available to cool the concentrated solution flowing from the concentrator before it is returned to the main body of the solution flowing through the conduit 23. A suitable baffle 39 may be provided within the concentrator 29 adjacent the upper end of the conduit 36 to provide a quiet zone of solution about the entrance to the conduit 36. It may also be desirable to provide a conduit 28a connecting the vapor space in the sump 20 with the concentrator to conduct air or other non-condensable gas to the concentrator around the conduit 28. The conduit 28 terminates below the liquid level in the concentrator in order to minimize any tendency of vapor to pass back from the concentrator to the absorber.

From the foregoing it is evident that a portion of the solution collected in the sump 20 is by-passed around the first portion of the conduit 23 through the concentrator. This arrangement provides a continual concentration of a portion of the solution being circulated through the apparatus.

Under certain conditions of operation it may happen that the degree of concentration attained in the concentrator is such that the solution returned through the jacket 37 and duct 38 may be cooled below its freezing point and may solidify or form a slush in the jacket 37 which will retard the return of concentrated solution to the conduit 23 and interrupt the operation of the system. In order to prevent the solidification of the solution in the jacket 37 and duct 38, I provide an electric heater 40 arranged in any suitable manner so that it heats the solution within the jacket 37 and connection 38. The heater, therefore, may be employed to thaw any frozen solution in the return connection between the concentrator 29 and the conduit 23 and also to maintain the flow of concentrated solution. In order to determine when some of the solution has frozen within the jacket 37, I provide a float 41 which floats on the solution in the concentrator 29 and moves a magnetic member 42 up and down within a housing 43 hermetically sealed to the concentrator. This housing may be constructed of any suitable nonmagnetic material. When the float rises sufficiently the magnetic member 42 will operate a switch 44 against the tension of a spring 45, the switch 44 being provided with a permanent magnet 46 which is attracted by the magnetic member 42 when it rises to a predetermined position. The operation of the switch 44 closes the circuit of the heater and connects the heater across electric supply lines 47 and 48, thereby energizing the heater and heating the solution within the jacket 37 and conduit 38 and thawing any frozen portion of the solution. The heater will remain energized until the solution has been melted as indicated by the fall of the level of the solution in the concentrator 29 due to the resumed free passage of the solution out of the concentrator through the connection 36.

During the operation of the system described above the water or other refrigerant circulated by the pump 16 through the coil 14 will be warmed by the absorption of heat from the air circulating through the duct 10. The warmed refrigerant will be returned to the evaporator through the spray head 17 and sprayed into the evaporator through a plurality of nozzles 49 in the space above the main body of liquid refrigerant. The sprays make a large surface available for the evaporation of refrigerant; and the refrigerant in the sprays, as well as the main body of refrigerant, is rapidly cooled by the evaporation of a portion of the refrigerant. The evaporated refrigerant is absorbed by the solution flowing from the nozzle 27 to the sump 20 through the venturi 19. A continuous flow of solution is maintained from the sump 20 to the nozzle 21 by operation of the pump 22, the solution being cooled by the water jacket 25. A portion of the solution from the sump 20 is by-passed continuously from the sump to the inlet of the pump 22 through the concentrator 29 so that the pump 22 receives a mixture of concentrated and weak solution. Should the cooling of the concentrated solution in the jacket 37 and conduit 38, prior to its return to the main body of solution, result in the freezing of the concentrated solution in the jacket there will be a rise in level of the liquid in the concentrator which will raise the float 41 and operate the switch 44, thereby energizing the heater 40 and melting the frozen portions of the solution. This will restore the clear passage for the concentrated solution and return the apparatus to normal operation, whereupon the level in the concentrator will fall and float 41 will lower the magnetic member 42 and allow the spring 45 to return the switch 44 to its open position.

From the foregoing it is readily apparent that I have provided a simple and effective arrangement for melting solidified portions of the concentrated solution in an absorption type refrigerating system and for automatically maintaining the solution in a fluid state and thus keeping the system in normal operation.

While I have described my invention in connection with a particular type of absorption refrigerating system employed for air conditioning, other applications will readily be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States is:

1. A refrigerating system of the absorption type including a refrigerant absorber and a solution concentrator, means for admitting weak solution to said concentrator, means including a conduit for returning concentrated solution from said concentrator to said absorber, and means dependent upon the solidification of a portion of the solution in said conduit for supplying heat to said conduit for melting said portion of the solution and for maintaining said solution in the fluid state in said conduit.

2. A refrigerating system of the absorption type including a refrigerant absorber and a solution concentrator, means including a conduit for admitting weak solution to said concentractor, means including a conduit arranged in heat exchange relation with said first mentioned conduit for returning concentrated solution from said concentrator to said absorber, means for supplying heat to said last mentioned conduit, and means dependent upon the solidification of a portion of the concentrated solution in said last mentioned conduit for energizing said heating means to melt the solidified portion of said solution and to maintain said solution in the fluid state.

3. A refrigerating system of the absorption type including a refrigerant absorber, means for circulating a refrigerant absorbing solution in a closed circuit through said absorber, means for cooling the solution in said circuit, a solution concentrator, means including inlet and outlet conduits for said concentrator and arranged to by-pass a portion of said closed circuit for concentrating a portion of the solution flowing from said absorber, means for heating said outlet conduit, and means dependent upon the solidification of a portion of the solution in said outlet conduit for energizing said heating means to melt said solution and to maintain said solution in the fluid state in said outlet conduit.

4. A refrigerating system of the absorption type including a refrigerant absorber and a solution concentrator, means for admitting weak solution to said concentrator, means including a conduit for returning concentrated solution from said concentrator to said absorber, and means dependent upon a predetermined rise in the level of solution in said concentrator for supplying heat to said conduit to raise the temperature of said conduit above the melting point of the solution therein.

5. A refrigerating system of the absorption type including a refrigerant absorber and a solution concentrator, means including a conduit for admitting weak solution to said concentrator, means including a conduit arranged in heat exchange relation with said first mentioned conduit for returning concentrated solution from said concentrator to said absorber, means for supplying heat to said last mentioned conduit, and means dependent upon a predetermined increase in the level of the solution in said concentrator for energizing said heating means to heat said last mentioned conduit to a temperature above the melting point of the solution therein.

6. A refrigerating system of the absorption type including a refrigerant absorber and a concentrator for concentrating weak absorbing solution, means for admitting weak solution to said concentrator, means including a conduit for conveying concentrated solution to said absorber, an electric heating element for heating said conduit, a float in said concentrator, and means including a switch arranged to be actuated by said float for energizing said electric heater upon a predetermined rise in the level of the solution in said concentrator to apply heat to said conduit and prevent the solidification of concentrated solution therein.

7. A refrigerating system of the absorption type including a refrigerant absorber and an absorbing solution concentrator, means for withdrawing absorbing solution from said absorber and for returning it thereto, means including inlet and outlet conduits for said concentrator arranged to by-pass a portion of said last mentioned means for concentrating a portion of the solution withdrawn from said absorber, means for collecting the concentrated solution in said outlet conduit, an electric heater for said outlet conduit, and means including a float operated switch dependent upon the level of solution in said concentrator for energizing said electric heater upon a predetermined rise in the level of solution in said concentrator to prevent the solidification of the solution in said outlet conduit.

MARCUS E. FIENE.